(12) United States Patent
Golombowski

(10) Patent No.: US 8,668,804 B2
(45) Date of Patent: Mar. 11, 2014

(54) ADHESIVE COMPOSITION ADAPTED FOR BONDING LARGE MASS PARTS TO STRUCTURES

(75) Inventor: Dietmar Golombowski, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 402 days.

(21) Appl. No.: 13/002,666

(22) PCT Filed: Jul. 14, 2009

(86) PCT No.: PCT/US2009/050461
§ 371 (c)(1),
(2), (4) Date: Jan. 5, 2011

(87) PCT Pub. No.: WO2010/021793
PCT Pub. Date: Feb. 25, 2010

(65) Prior Publication Data
US 2011/0108183 A1    May 12, 2011

Related U.S. Application Data

(60) Provisional application No. 61/090,986, filed on Aug. 22, 2008.

(51) Int. Cl.
| | |
|---|---|
| C09J 4/00 | (2006.01) |
| C09J 101/00 | (2006.01) |
| C09J 201/00 | (2006.01) |
| E04B 2/00 | (2006.01) |
| E04F 13/00 | (2006.01) |
| C08C 19/44 | (2006.01) |
| C08L 9/00 | (2006.01) |
| C08G 18/28 | (2006.01) |
| C08L 75/00 | (2006.01) |

(52) U.S. Cl.
USPC ........... 156/331.7; 156/71; 524/572; 524/590

(58) Field of Classification Search
USPC ......................... 156/71, 331.7; 524/572, 590
See application file for complete search history.

(56) References Cited

U.S. PATENT DOCUMENTS

| | | |
|---|---|---|
| 3,707,521 A | 12/1972 | De Santis |
| 3,779,794 A | 12/1973 | De Santis |
| 4,374,237 A | 2/1983 | Berger et al. |
| 4,444,704 A | 4/1984 | Hira et al. |
| 4,525,511 A | 6/1985 | Kirby et al. |
| 4,538,920 A | 9/1985 | Drake |
| 4,552,934 A | 11/1985 | Rabito et al. |
| 4,659,779 A | 4/1987 | Bagga et al. |
| 4,687,533 A | 8/1987 | Rizk et al. |
| 4,728,710 A | 3/1988 | Goel |
| 4,739,019 A | 4/1988 | Schappert et al. |
| 4,743,672 A | 5/1988 | Goel |
| 4,780,520 A | 10/1988 | Rizk et al. |
| 4,824,888 A | 4/1989 | Emmerling et al. |
| 4,828,755 A | 5/1989 | Kasumgar |
| 4,876,308 A | 10/1989 | Melby et al. |
| 4,910,279 A | 3/1990 | Gillis et al. |
| 5,002,806 A | 3/1991 | Chung et al. |
| 5,041,517 A | 8/1991 | Vu et al. |
| 5,063,269 A | 11/1991 | Hung |
| 5,073,601 A | 12/1991 | Mülhaupt et al. |
| 5,082,147 A | 1/1992 | Jacobs |
| 5,143,996 A | 9/1992 | Chung et al. |
| 5,162,457 A | 11/1992 | Hamsel |
| 5,164,473 A | 11/1992 | Dormish et al. |
| 5,166,300 A | 11/1992 | Rumon |
| 5,175,228 A | 12/1992 | Wang et al. |
| 5,194,502 A | 3/1993 | Saito et al. |
| 5,278,257 A | 1/1994 | Mülhaupt et al. |

(Continued)

FOREIGN PATENT DOCUMENTS

| | | |
|---|---|---|
| CA | 2 154 243 A1 | 1/1996 |
| EP | 0 411 432 A2 | 2/1991 |

(Continued)

OTHER PUBLICATIONS

Office Action Application No. JP2011/523843 dated May 21, 2013; containing explanation of relevance of JP 52-13219.

(Continued)

*Primary Examiner* — Michael Orlando
(74) *Attorney, Agent, or Firm* — The Dobrusin Law Firm PC

(57) ABSTRACT

The invention is a two-part composition comprising: A) in one part (i) one or more isocyanate functional prepolymers; and B) in a second part (ii) one or more compounds having isocyanate reactive groups; (iii) one or more fillers selected such that the composition is nonconductive; (iv) one or more catalysts for the reaction of isocyanate groups with active hydrogen containing compounds wherein either or both of the one or more isocyanate functional prepolymers and the one or more compounds having isocyanate reactive groups have solid organic particles grafted thereto such that the composition contains from about 6 to about 13 percent by weight of the total composition of solid organic particles. In a preferred embodiment, the second part comprises from about 35 to about 65 percent by weight of one or more compound having isocyanate reactive groups which have solid organic particles grafted to the backbone. In another preferred embodiment, the one or more isocyanate functional prepolymers comprise about 14 to about 20 percent by weight of solid organic particles grafted to the backbone of the prepolymers. In another preferred embodiment, the solid particles comprise a thermoplastic polymer or rubber-modified thermoplastic polymer.

20 Claims, No Drawings

(56) References Cited

U.S. PATENT DOCUMENTS

| | | |
|---|---|---|
| 5,340,901 A | 8/1994 | Wang |
| 5,354,609 A | 10/1994 | Wang |
| 5,367,036 A | 11/1994 | Saito et al. |
| 5,548,056 A | 8/1996 | Chung |
| 5,603,798 A | 2/1997 | Bhat |
| 5,623,044 A | 4/1997 | Chiao |
| 5,631,318 A | 5/1997 | Ito et al. |
| 5,672,229 A | 9/1997 | Konig et al. |
| 5,698,656 A | 12/1997 | Ohashi et al. |
| 5,719,252 A | 2/1998 | Dormish et al. |
| 5,744,088 A | 4/1998 | Cuyper |
| 5,747,581 A | 5/1998 | Proebster |
| 5,852,103 A | 12/1998 | Bhat |
| 5,852,137 A | 12/1998 | Hsieh et al. |
| 5,922,809 A | 7/1999 | Bhat et al. |
| 5,951,796 A | 9/1999 | Murray |
| 5,976,305 A | 11/1999 | Bhat et al. |
| 6,001,204 A | 12/1999 | Haig et al. |
| 6,015,475 A | 1/2000 | Hsieh |
| 6,133,398 A | 10/2000 | Bhat et al. |
| RE37,386 E | 9/2001 | Melby et al. |
| 6,423,810 B1 | 7/2002 | Huang et al. |
| 6,512,033 B1 | 1/2003 | Wu |
| 6,709,539 B2 | 3/2004 | Zhou |
| 6,749,943 B1 | 6/2004 | Tangen et al. |
| 6,767,959 B2 | 7/2004 | Bosshard et al. |
| 6,776,869 B1 | 8/2004 | Schenkel |
| 6,866,743 B2 | 3/2005 | Paulson et al. |
| 6,965,008 B2 | 11/2005 | Symietz et al. |
| 7,101,950 B2 | 9/2006 | Zhou et al. |
| 7,361,292 B2 | 4/2008 | Zhou et al. |
| 7,615,595 B2 | 11/2009 | Lutz et al. |
| 7,771,622 B2 | 8/2010 | Zhou |
| 2002/0100550 A1 | 8/2002 | Mahdi et al. |
| 2004/0266899 A1 | 12/2004 | Muenz et al. |
| 2005/0054764 A1 | 3/2005 | Zhou et al. |
| 2005/0070634 A1 | 3/2005 | Lutz et al. |
| 2005/0209401 A1 | 9/2005 | Lutz et al. |
| 2006/0096694 A1 | 5/2006 | Zhou |
| 2006/0205897 A1 | 9/2006 | Frick et al. |
| 2006/0276601 A1 | 12/2006 | Lutz et al. |
| 2006/0293489 A1 | 12/2006 | Zhou et al. |
| 2007/0270567 A1* | 11/2007 | Suen .............................. 528/64 |
| 2008/0149257 A1 | 6/2008 | Tribelhorn et al. |
| 2008/0185098 A1 | 8/2008 | Wu et al. |
| 2009/0044907 A1 | 2/2009 | Tribelhorn et al. |

FOREIGN PATENT DOCUMENTS

| | | |
|---|---|---|
| EP | 0 676 427 A2 | 10/1995 |
| EP | 0 699 698 A2 | 3/1996 |
| EP | 0 819 749 A2 | 1/1998 |
| EP | 0 849 343 A1 | 6/1998 |
| EP | 0 705 287 B1 | 10/2002 |
| EP | 1 524 282 A1 | 4/2005 |
| EP | 1 602 702 A1 | 12/2005 |
| EP | 1 671 996 A2 | 6/2006 |
| EP | 1 433 802 B1 | 10/2007 |
| JP | 52-13219 S | 4/1977 |
| JP | 2-011616 A | 1/1990 |
| JP | 3-043481 A | 2/1991 |
| WO | 96 21 688 A1 | 7/1996 |
| WO | 02/092 714 A1 | 11/2002 |
| WO | 2004/056903 A1 | 7/2004 |
| WO | 2005/019292 A1 | 3/2005 |
| WO | 2006/052505 A1 | 5/2006 |

OTHER PUBLICATIONS

International Search Report and Written Opinion dated Jan. 18, 2010 for related PCT US/09/050461 filed Jul. 14, 2009 and Published as WO 2010/021793 on Feb. 25, 2010.

IPER dated Dec. 2, 2010 for related PCT US/09/050461 filed Jul. 14, 2009 and Published as WO 2010/021793 on Feb. 25, 2010.

Kohler et al., "An Apparatus for Determining Both the Quantity of Gas Evolved and the Amount of Reagent Consumed in Reactions with Methyl Magnesium Iodide" Journal of the American Chemical Society, 1927, 3181, 49.

Co-pending U.S. Appl. No. 11/824,984, filed Jul. 3, 2007; Published as 2008/0149257 Jun. 26, 2008.

Co-pending U.S. Appl. No. 12/177,706, filed Jul. 22, 2008; Published as 2009/044907 A1 on Feb. 19, 2009.

Sika Tack-ASAP, "Hot Applied Windshield Adhesive" Technical Sheet, Jul. 2003, Sika Corporation.

Oertel G. "11.3 Two-Component Reaction Adhesives" Polyurethane Handbook, 598-601, Jan. 1994.

Bae et al. "Effect of the Structure of Chain Extenders on the Dynamic Mechanical Behaviour of Polyurethane" Journal of Material Science, Jun. 1, 1999, 2523-2527, vol. 34. No. 11.

* cited by examiner

ADHESIVE COMPOSITION ADAPTED FOR BONDING LARGE MASS PARTS TO STRUCTURES

CLAIM OF PRIORITY

This application is a national phase filing under 35 USC §371 from PCT Application serial number PCT/US2009/050461, filed on 14 Jul. 2009, and claims priority therefrom. This application further claims priority from United States Provisional Application Ser. No. 61/090,986 filed on, 22 Aug. 2008, both incorporated herein by reference.

FIELD OF INVENTION

This invention relates to a two-part composition containing an isocyanate functional component and a isocyanate reactive component. The invention relates to methods of bonding substrates together using the two-part composition and to structures comprising substrates bonded using the composition. Among preferred structures are buildings and transportation vehicles.

BACKGROUND OF INVENTION

Compositions having isocyanate functional components are utilized to bond substrates together. One common use of such compositions is to bond glass, often in the form of windows, into structures. In automotive assembly plants windows are often bonded in with one part adhesive compositions containing isocyanate functional components. Typically these compositions cure by reaction with ambient moisture. One part adhesives are used because the equipment required to dispense and apply the adhesives are less complex than the equipment used to apply two-part adhesive compositions. The one part moisture curing adhesives typically take several hours to cure. In the assembly plant environment, vehicles are not driven for several hours and this slow curing process is acceptable. One part moisture curing adhesives known in the art are disclosed in U.S. Pat. Nos. 4,374,237, 4,687,533, 4,780,520, 5,063,269, 5,623,044, 5,603,798, 5,852,137, 5,922,809, 5,976,305, 5,852,137 and 6,512,033, relevant portions incorporated herein by reference. Examples of commercial one part adhesives include BETASEAL™ 15630, 15625, 61355 adhesives available from The Dow Chemical Company, EFBOND™ windshield adhesives available from Eftec, WS 151™, WS212™ adhesives available from Yokohama Rubber Company, and SIKAFLEX™ adhesives available from Sika Corporation.

Two-part compositions containing isocyanate functional compounds or prepolymers in one part and compounds and/or prepolymers having isocyanate reactive components in the other part are used in situations where cure speed is important. One such environment is in the automotive aftermarket replacement glass business. Often customers desire that the adhesive cures quickly so that the vehicle can be driven as soon as possible after bonding of the replacement window into the vehicle. The advantage of a two-part adhesive is that the curing reaction proceeds at a much faster reaction rate than does a one part moisture curing adhesive system. Examples of two-part compositions containing isocyanate functional compounds or prepolymers in one part and compounds and/or prepolymers having isocyanate reactive components in the other part are disclosed in EP 1,524,282, U.S. Pat. Nos. 5,852,103, 6,709,539, 7,101,950 and 7,361,292, relevant parts incorporated herein by reference.

Adhesives are utilized in bonding of large windows into large transportation vehicles such as train cars and engines, busses and large trucks. The mass of these windows creates a need for adhesives which have a unique set of properties. In particular adhesives which have a good green strength shortly after application are needed, typical one part adhesives do not provide such green strength properties. Further, the adhesive systems need a longer open time, the time from application of the adhesive to a substrate until the adhesive can no longer adhere to a substrate, than a typical two-part adhesive allows. An open time of between 15 minutes and 30 minutes is desired. Thus, what is needed is a two-part adhesive system which exhibits a good green strength, that has the capability to hold a large mass window in place upon application and a longer open time to allow for slower sealant application and assembly process and for possible adjustment of the window after contacting the window with a window frame.

SUMMARY OF INVENTION

The invention is a two-part composition comprising A) in one part (i) one or more isocyanate functional prepolymers; and B) in a second part (ii) one or more compounds having isocyanate reactive groups; (iii) one or more fillers selected such that the composition is nonconductive; (iv) one or more catalysts for the reaction of isocyanate groups with active hydrogen containing compounds: wherein either or both of the one or more isocyanate functional prepolymers and the one or more compounds having isocyanate reactive groups have solid organic particles grafted thereto such that the composition contains from about 6 to about 13 percent by weight of the total composition of solid organic particles. In a preferred embodiment, the second part comprises from about 35 to about 65 percent by weight of one or more compounds having isocyanate reactive groups which have solid organic particles grafted to the backbone. In another preferred embodiment, the one or more isocyanate functional prepolymers comprise about 14 to about 20 percent by weight of solid organic particles grafted to the backbone of the prepolymers. In another preferred embodiment, the solid particles comprise a thermoplastic polymer or rubber-modified thermoplastic polymer.

In another embodiment, the invention is a method of bonding two or more substrates together comprising contacting the two-parts of a composition according to this invention and contacting the contacted parts of the composition with two or more substrates with the contacted parts of the composition disposed between substrates so as to bond the substrates together. In a preferred embodiment, one substrate is glass, preferably a window, and the other substrate comprises a structure to which the glass is bonded, preferably a building or transportation vehicle.

The composition of the invention is useful as an adhesive to bond substrates together. A variety of substrates may be bonded together using the composition, for instance, plastics, glass, wood, ceramics, metal, coated substrates and the like. The compositions of the invention may be used to bond similar and dissimilar substrates together. The compositions are especially useful for bonding glass to other substrates such as vehicles and buildings. The compositions of the invention are also useful in bonding parts of modular components together, such as vehicle modular components. The glass can be bonded to coated and uncoated portions of vehicles. The compositions of the invention provide adequate green strength to allow a large mass article, such as a window, to be held in place shortly after bonding such a large mass article to another substrate. Further, the compositions of the invention provide a long enough open time to allow proper contacting of the large mass article with the other substrate and adjustment of the articles with respect to one another. The invention is a method wherein the window has a mass of greater than about 20 to about 120 kilograms.

DETAILED DESCRIPTION OF THE INVENTION

In order to achieve the desired properties of the compositions of the invention either the isocyanate functional prepolymer in the first part, Part A, or the compound having isocyanate reactive groups in the second part, Part B, or both have grafted to their backbones solid organic particles. Solid organic particles which may be grafted to the backbones of the isocyanate reactive prepolymer in the first part, Part A, or the compound having isocyanate reactive groups in the second part, Part B, or both include any particles which improve the elastomeric nature and the green strength of the composition of the invention when the two-parts are combined. Preferable solid organic particles comprise thermoplastic polymer or rubber-modified thermoplastic polymer particles. Preferable thermoplastic polymers are those based on monovinylidene aromatic monomers and copolymers of monovinylidene aromatic monomers with conjugated dienes, acrylates, methacrylates, unsaturated nitriles or mixtures thereof. The copolymers can be block or random copolymers. More preferably, the organic particles comprise one or more copolymers of unsaturated nitriles, conjugated dienes and monovinylidene aromatic monomers and/or one or more copolymers of unsaturated nitriles and monovinylidene aromatic monomers. Even more preferably the particles comprise styrene-acrylonitrile copolymers. The organic polymer particles preferably have a particle size which is large enough to improve the elastomeric properties and green strength of the finally cured adhesive, but not so large so as to reduce the ultimate strength of the adhesive after cure. Preferably, the particle size is about 10 microns or greater and more preferably the particle size is about 20 microns or greater. Preferably, the particle size is about 50 microns or less and more preferably the particle size is about 40 microns or less. The compositions contain a sufficient amount of organic polymer particles such that the adhesive upon contacting the parts has sufficient green strength to hold a large mass article in place before complete cure, exhibits a long enough open time to allow contacting of a large mass article with the structure to which it is to be bonded, adjustment of the placement of the large mass article and not so much such that the cured adhesive has too much elasticity as defined by elongation. Preferably, the compositions according to the invention upon cure have sufficient strength for the desired use. Preferably, the composition contains about 6 percent by weight or greater of organic polymer particles based on the total weight of the composition, more preferably about 7 percent by weight or greater and most preferably about 8 percent by weight or greater. Preferably, the composition contains about 13 percent by weight or less of organic polymer particles based on the total weight of the composition, more preferably about 12 percent by weight or less and most preferably about 10 percent by weight or less.

In the embodiment wherein the organic particles are located in the part with the isocyanate functional prepolymer, such part preferably contains the amount of organic particles to achieve the properties described hereinbefore. Preferably, the isocyanate functional prepolymer has grafted thereto greater than 0 percent by weight of organic polymer particles based on the weight of the first part, part A, preferably about 4 percent by weight or greater and most preferably about 6 percent by weight or greater. Preferably, the isocyanate functional prepolymer has grafted thereto about 26 percent by weight or less of organic polymer particles based on the weight of the first part, Part A, preferably about 20 percent by weight or less and more preferably about 14 percent by weight or less. In the embodiment wherein the organic particles are located in the part with the isocyanate reactive compound, such part preferably contains the amount of organic particles to achieve the properties described hereinbefore. Preferably, the isocyanate reactive compound has grafted thereto about 12 percent by weight or greater of organic polymer particles based on the weight of the second part, part B and most preferably about 14 percent by weight or greater. Preferably, the isocyanate reactive group containing compound has grafted thereto about 26 percent by weight or less of organic polymer particles based on the weight of the second part, part B and most preferably about 20 percent by weight or less.

The composition of the invention comprises two-parts, a first part, Part A, which comprises one or more isocyanate functional prepolymers and a second part, part B, which comprises one or more compounds containing one or more isocyanate reactive compounds. The isocyanate reactive compounds react with the isocyanate functional prepolymers to form a cured composition which exhibits good adhesive properties to many substrates. Upon contacting the two-parts, the composition and the isocyanate reactive groups begin to react with the isocyanate groups. The final cure of the combined compositions takes some time to reach completion. This provides the composition with a desirable open time. "Open time" is understood to mean the time after contacting the two-parts until the mixture starts to become a high viscous paste and is not subject to deformation during assembly to conform to the shape of the second substrate and to adhere to it. Preferably, the open time is about 8 minutes or greater and more preferably about 15 minutes or greater. Preferably, the open time is 30 minutes or less, more preferably about 25 minutes or less and most preferably about 20 minutes or less. The combined composition exhibits the desired green strength as discussed above. Preferably, the adhesive exhibits a lap shear strength of 0.6 MPa or greater after 60 minutes, more preferably about 0.8 Mpa or greater and most preferably about 1.0 MPa or greater as determined according to DIN 53283. The composition, once combined, exhibits consistent properties over a wide range of application temperatures. Preferably, there is little variability over the temperature range of about 0° C. to about 45° C.

"One or more" as used herein means that at least one, or more than one, of the recited components may be used as disclosed. "Nominal" as used with respect to functionality means the theoretical functionality, generally this can be calculated from the stoichiometry of the ingredients used. Generally, the actual functionality is different due to imperfections in raw material, incomplete conversion of the reactants and formation of by-products.

The first part comprises one or more isocyanate functional prepolymers. The one or more isocyanate functional prepolymers may be prepared by any suitable method, such as by reacting compounds having more than one isocyanate reactive group, such as polyamines and polyols (diols, triols and dispersion triols such as a copolymer polyol or grafted triol), with an excess over stoichiometry of one or more polyisocyanates under reaction conditions sufficient to form a prepolymer having isocyanate functionality and free isocyanate content which meets the criteria discussed herein. In a preferable method used to prepare the prepolymer, the polyisocyanates are reacted with one or more diols, one or more triols and one or more dispersion triols, and optionally one or more amine terminated polyethers. The compounds having more than one isocyanate reactive groups are present in an amount sufficient to react with most of the isocyanate groups leaving enough isocyanate groups to correspond with the desired free isocyanate content of the prepolymer. The isocyanate functional prepolymer may be prepared by any suitable method, such as bulk polymerization and solution polymerization. Preferable components for preparing the isocyanate functional prepolymers are disclosed in Zhou et al., 7,361,292, relevant parts incorporated herein by reference. Preferable processes for the preparation of the prepolymers are disclosed in U.S. Pat. No. 5,922,809 at column 9, lines 4 to 51 incorporated herein by reference.

Preferable polyisocyanates for use in preparing the prepolymer include those disclosed in U.S. Pat. No. 5,922,809 at column 3, line 32 to column 4, line 24, incorporated herein by reference. Preferably, the polyisocyanate is an aromatic or cycloaliphatic polyisocyanate such as diphenylmethane-4,4'-diisocyanate, isophorone diisocyanate, tetramethylxylene diisocyanate, and is most preferably diphenylmethane-1-4,4'-diisocyanate. The diols and triols are generically referred to as polyols. Polyols useful in this invention are diols and triols corresponding to the polyols described in U.S. Pat. No. 5,922,809 at column 4, line 60 to column 5, line 50, incorporated herein by reference. Preferably, the polyols are polyether polyols and more preferably polyoxyalkylene oxide polyols. Most preferred triols are ethylene oxide-capped polyols prepared by reacting a compound having one or more active hydrogens, such as glycerin with propylene oxide, followed by reacting the product with ethylene oxide.

In one embodiment as described above, the prepolymer contains one or more organic based polymers grafted to the backbone. Preferably, the organic based polymer is included in the prepolymer by inclusion of a dispersion triol having dispersed therein particles of an organic based polymer. The preferable dispersion triols are disclosed in Zhou, U.S. Pat. No. 6,709,539 at column 4, line 13 to column 6, line 18, incorporated herein by reference. Among preferable polyols utilized in preparing the isocyanate reactive prepolymer include SPECFLEX™ NC 700 copolymer polyols; VORALUX™ HL 430 copolymer polyols available from The Dow Chemical Company and ARCOL™ 1096 copolymer polyols available from Bayer.

Preferably, the polyoxyalkylene oxide triol comprises a polyoxypropylene chain with a polyoxyethylene end cap. Preferably, the triols used have a molecular weight of about 4,000 or greater, more preferably about 5,000 or greater and most preferably about 6,000 or greater. Preferably, such triol has molecular weight of about 8,000 or less and more preferably about 7,000 or less. The particles may be dispersed in the triol or grafted to the backbone of some of the triols. Preferably, the particles are grafted to the backbone of the triols. The dispersion triol contains a sufficient amount of organic polymer particles such that the composition exhibits the desired properties as described herein. Preferably, the dispersion triol contains about 20 percent by weight or greater of organic polymer particles copolymer based on the dispersion, preferably about 30 percent by weight or greater and more preferably about 35 percent by weight or greater. Preferably, the dispersion contains about 60 percent by weight or less of organic polymer particles based on the dispersion, preferably about 50 percent by weight or less and more preferably about 45 percent by weight or less. The polyols (diols and triols and dispersion polyols) are present in the composition in an amount sufficient to react with most of the isocyanate groups of the isocyanates leaving enough isocyanate groups to correspond to A-component of the composition.

In the embodiment wherein the isocyanate reactive preopolymer has solid organic particles grafted thereto, the amount of organic particles present is sufficient to give the combined composition the desired properties as described herein. Preferably, the isocyanate functional prepolymers contain about 2 percent by weight or greater of solid organic particles, more preferably about 5 percent by weight or greater and most preferably about 10 percent by weight or greater. Preferably, the isocyanate functional prepolymers contain about 26 percent by weight or less of solid organic particles, more preferably about 22 percent by weight or less and most preferably about 18 percent by weight or less. The one or more isocyanate functional prepolymers present in the first part, Part A, can contain from 0 percent by weight to 100 percent by weight of prepolymers having organic particles grafted thereto. The important feature is the total weight of the organic particles present in the combined composition as described hereinbefore. Thus, a mixture of isocyanate functional polymers having no organic polymer particles grafted thereto and of isocyanate functional prepolymers having organic particles grafted thereto may be utilized, provided the desired amount of organic particles are present in the total composition.

The isocyanate functional prepolymer is present in the first part in a sufficient amount to give the composition adhesive properties and to enhance the desired properties of the compositions of the invention as described herein. Preferably, the isocyanate functional prepolymer is present in the first part in an amount of about 10 percent by weight or greater of the first part, more preferably about 20 percent by weight or greater and most preferably about 30 percent by weight or greater. Preferably, the isocyanate functional prepolymer is present in the first part in an amount of about 90 percent by weight or less of the first part, more preferably about 70 percent by weight or less and most preferably about 50 percent by weight or less. In the embodiment wherein a mixture of isocyanate function prepolymers is utilized wherein a portion of the isocyanate function prepolymers have organic particles grafted thereto, the isocyanate function prepolymers with organic particles grafted thereto are present in the first part in an amount of about 10 percent by weight or greater of the first part, more preferably about 20 percent by weight or greater and most preferably about 30 percent by weight or greater. Preferably, the isocyanate functional prepolymer is present in the first part in an amount of about 60 percent by weight or less and most preferably about 50 percent by weight or less.

The first part, Part A may further comprise one or more polyfunctional isocyanates for the purpose of improving the modulus of the composition in the cured form. "Polyfunctional" as used in the context of the isocyanates refers to isocyanates having a functionality of 2.2 or greater. The polyfunctional isocyanates can be any monomeric, oligomeric or polymeric isocyanate having a nominal functionality of about 2.2 or greater. More preferably the polyfunctional isocyanate has a nominal functionality of about 2.7 or greater. Preferably, the polyfunctional isocyanates have a nominal functionality of about 4 or less, and most preferably about 3.2 or less. The polyfunctional isocyanate can be any isocyanate which is reactive with the isocyanate reactive compounds used in the composition and which improves the modulus of the cured composition. The polyfunctional isocyanates can be monomeric; trimers, isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, available from Bayer under the trademark and designations DESMODUR® N3300 and N-100, and polymeric isocyanates such as polymeric MDI (methylene diphenyl diisocyanates) such as those marketed by The Dow Chemical Company under the trademark of PAPI™ including PAPI™ 20 polymeric isocyanate. The polyfunctional isocyanates are present in a sufficient amount to impact the modulus of the cured compositions of the invention. If too much is used, the cure rate of the composition is unacceptably slowed down. If too little is used, the desired modulus levels are not achievable. The polyfunctional isocyanate is preferably present in an amount of about 0.5 percent by weight or greater based on the weight of the composition, A- and B-side, more preferably about 1.0 percent by weight or greater and most preferably about 1.4 percent by weight or greater. The polyfunctional isocyanate is preferably present in an amount of about 8 percent by weight or less, based on the weight of the composition, A- and B-side, more preferably about 5 percent by weight or less and most preferably about 2.0 percent by weight or less.

The first part, part A, may further comprise one or more isocyanate functional prepolymers containing one or more polyester based polyols which are solid at ambient temperature, about 23° C. The polyester based polyols have melting points such that the prepolymer provides sufficient green strength to prevent the substrates from moving in relation to one another due to gravitational forces and such that the prepolymer is solid at ambient temperatures. In terms of installing a window in a vehicle or building, the polyester based prepolymer prevents the window from sliding after installation. Preferably, the polyester polyols have melting points of about 40° C. or greater, even more preferably about 45° C. or greater and most preferably about 50° C. or greater. Preferably, the polyester polyols exhibit melting points of about 85° C. or less and most preferably about 60° C. or less and even more preferably about 70° C. or less. The polyester based isocyanate prepolymer can be prepared using one or more polyester polyols. The amount of polyester polyol in the prepolymer is a sufficient amount to provide the needed green strength to the composition of the invention, to render it solid and the desired rheology of the composition. Preferably, the polyester polyol is present in the polyester polyol based isocyanate prepolymer in an amount of about 70 percent by weight or greater based on the weight of the prepolymer and more preferably about 80 percent by weight or greater. Preferably, the polyester polyol is present in the polyester polyol based isocyanate prepolymer in an amount of about 95 percent by weight or less based on the weight of the prepolymer and more preferably about 90 percent by weight or less. Preferably, the polyester polyol based isocyanate prepolymer is present in the adhesive composition in an amount of about 1 percent by weight or greater based on the weight of the prepolymer and most preferably about 2 percent by weight or greater. Preferably, the polyester polyol based isocyanate prepolymer is present in the adhesive composition in an amount of about 5 percent by weight or less and most preferably about 3 percent by weight or less. The polyester polyol can be any polyester composition that meets the property requirements defined, that is, crystalline at ambient temperatures and melts in the desired temperature range. Preferred polyester polyols are prepared from linear diacids and linear diols. A more preferred diacid is adipic acid. More preferred diols are the $C_{2-6}$ diols, with butane diols, pentane diols and hexane diols being most preferred. The polyester based polyisocyanate prepolymers can be prepared using the processes and isocyanates described hereinbefore. Preferred polyester polyols are available from EVONIC Industries under the tradename DYNACOLL and the designations 7360 and 7330, with 7360 more preferred.

The second part of the composition of the invention comprises one or more compounds which contain isocyanate reactive groups. Preferably, the isocyanate reactive groups are active hydrogen containing groups. The isocyanate reactive groups upon contact with the isocyanate functional groups of the first part react with isocyanate functional groups to cure the composition. The compounds which contain isocyanate reactive groups can be any compounds which contain such isocyanate reactive groups which react with isocyanates on isocyanate functional prepolymers. The term "isocyanate-reactive compound" as used herein includes any organic compound having at least two isocyanate-reactive moieties, such as a compound containing an active hydrogen moiety, or an imino-functional compound. For the purposes of this invention, an active hydrogen containing moiety refers to a moiety containing a hydrogen atom which, because of its position in the molecule, displays significant activity according to the Zerewitinoff test described by Wohler in the *Journal of the American Chemical Society*, Vol. 49, p. 3181 (1927). Illustrative of such active hydrogen moieties are —COOH, —OH, —NH$_2$, —NH—, —CONH$_2$, —SH, and —CONH—. Preferable active hydrogen containing compounds include polyols, polyamines, polymercaptans and polyacids. In another embodiment, the active hydrogen containing compound may be an active hydrogen functional prepolymer which is the reaction product of one or more polyisocyanates and one or more active hydrogen containing compounds under conditions that an excess of active hydrogen reactive groups are present in an amount such that the reactive groups on the resulting prepolymer are active hydrogen containing compounds reactive with isocyanate groups. Suitable imino-functional compounds are those which have at least one terminal imino group per molecule, such as are described, for example, in U.S. Pat. No. 4,910,279, which is hereby incorporated by reference in its entirety. Preferably, the isocyanate reactive compound is a polyol or an amine terminated polyol, and is more preferably a polyether polyol or polyether polyamine. In a preferred embodiment, isocyanate reactive group containing polyol or a prepolymer having isocyanate reactive groups are utilized in conjunction with one or more chain extenders or crosslinking agents and/or one or more amine terminated polyols. Compounds containing isocyanate reactive groups are present in second part of the composition of the invention in sufficient amount to cure the composition by reacting with the isocyanate functional compound upon contacting the two-parts of the composition and to impart to the composition the desired properties of the composition. Preferably, the one or more compounds containing isocyanate reactive groups is present in the second part in an amount of about 10 percent by weight or greater of the second part, more preferably about 20 percent by weight or greater and most preferably about 30 percent by weight or greater. Preferably, the one or more compounds containing isocyanate reactive groups is present in the second part in an amount of about 100 percent by weight or less of the second part, more preferably about 60 percent by weight or less and most preferably about 50 percent by weight or less. In one embodiment where the second part comprises one or more compounds having isocyanate reactive groups with organic particles grafter thereto, the second part further comprises one or more compounds having isocyanate reactive groups which compounds do not have organic particles grafted thereto, that is, such compounds are free of solids. In a preferred embodiment, the amount of isocyanate reactive compounds which do not have organic particles grafted thereto, that are solid free, is from about 5 to about 30 percent by weight of the second part.

The second part, part B, of the composition of the invention in addition to other compounds containing isocyanate reactive groups may further comprise one or more low molecular weight compounds having two or more isocyanate reactive groups and a hydrocarbon backbone wherein the backbone may further comprise one or more heteroatoms. Such low molecular weight compounds may be compounds known in the art as chain extenders, such compounds are difunctional. Such low molecular weight compounds may be compounds also known in the art as crosslinkers, such compounds have, on average, greater than two active hydrogen groups per compound. The heteroatoms in the backbone can be oxygen, sulfur, nitrogen or a mixture thereof, wherein oxygen, nitrogen or a mixture thereof is more preferred and oxygen is most preferred. Preferably, the molecular weight of the low molecular weight compound is about 120 or less and more preferably about 100 or less. Preferably, the low molecular weight compound comprises one or more multifunctional alcohols, multifunctional alkanol amines, one or more adducts of multifunctional alcohol and an alkylene oxide, one or more adducts of a multifunctional alkanol amine and an alkylene oxide or a mixture thereof. Preferred low molecular weight compounds are straight chain hydrocarbons which may contain one or more heteroatoms in the backbone. Among preferred multifunctional alcohols and multifunctional alkanol amines are ethane diol, propane diol, butane diol, hexane diol, heptane diol, octane diol, glycerine, trimethylol propane, pentaerythritol, neopentyl glycol, ethanol amines and propanol amines. Among preferred adducts containing alkylene oxides are adducts of alcohols having 3 or more hydroxyl groups and ethylene oxide or propylene oxide units. More preferred low molecular weight compounds include ethane diol, propane diol, butane diol, hexane diol, octane diol, glycerine, trimethylol propane, diethanol amine, triethanol amine, di-isopropanol amine, tri-isopropanol amine and the like. Blends of various low molecular weight compounds may be used. Preferably, the low molecular weight compound is present in the second part of the composition of the invention, in addition to other compounds having isocyanate reactive groups, in an amount of greater than 0 percent by weight, more preferably about 0.3 percent by weight or greater and most preferably about 0.5 percent by weight or greater. Preferably, the low molecular weight compound is present in the second part of the composition of the invention in an amount of about 10 percent by weight or less, more preferably about 5 percent by weight or less and most preferably about 3 percent by weight or less.

The second part of the composition may further contain one or more polyester polyols, such as those described hereinbefore. The polyester polyols can be added in a sufficient amount to improve the green strength of the contacted composition of the invention. If present the polyester polyols are preferably present in an amount of about 1 percent by weight or greater and more preferably about 2 percent by weight or greater. If present the polyester polyols are preferably present in an amount of about 15 percent by weight or less, more preferably about 8 percent by weight or less and most preferably about 3 percent by weight or less.

The second part, Part B, may further comprise polyoxyalkylene polyamine having 2 or greater amine groups per polyamine. Such compounds may function as gelling agents as described herein. Preferably, the polyoxyalkylene polyamine has 2 to 4 amines per polyamine and most preferably 2 to 3 amines per polyamine. Preferably, the polyoxyalkylene polyamine has a weight average molecular weight of about 200 or greater and most preferably about 400 or greater. Preferably, the polyoxyalkylene polyamine has a weight average molecular weight of about 5,000 or less and most preferably about 3,000 or less. Among preferred polyoxyalkylene polyamines are JEFFAMINE™ T-403 polypropylene oxide triamine having a molecular weight of about 400 and JEFFAMINE™ D-400 polypropylene oxide diamine having a molecular weight of about 400. The polyoxyalkylene polyamines are present in a sufficient amount to prevent the composition from sagging once mixed and applied. Preferably, the polyoxyalkylene polyamine is present in the composition of the invention in an amount of about 0.2 percent by weight or greater, more preferably about 0.3 percent by weight or greater and most preferably about 0.5 percent by weight or greater. Preferably, the polyoxyalkylene polyamine is present in the composition of the invention in an amount of about 6 percent by weight or less, more preferably about 4 percent by weight or less and most preferably about 2 percent by weight or less.

Each part of the composition preferably comprises one or more fillers. Fillers are added for a variety of reasons and one or more types of fillers may be utilized in the parts of composition of this invention. Fillers, such as, clays, alumina, limestone, talc, calcium carbonate, carbon black, silicas and expanded perlites, may be added to reinforce the composition, to impart the appropriate viscosity and rheology and to strike a balance between cost and the desired properties of the composition and the parts of the composition. One preferred group of fillers useful in the invention are fillers that impart a balance of cost and viscosity to the each part. Among fillers useful for this purpose are talc, calcium carbontes, and kaolin. Such fillers are preferably non-pigmented fillers and are used in a sufficient amount to impart an acceptable balance of viscosity and cost to the formulation and to achieve the desired properties of the composition. Preferred non pigmented fillers include calcium carbonate or kaolin. Calcium carbonates useful in this invention are standard calcium carbonates. Such standard calcium carbonates are untreated, that is, they are not modified by treatment with other chemicals, such as organic acids or esters of organic acids. Kaolin is also known as Kaolinite and comprises compounds represented by the chemical formula $Al_2Si_2O_5(OH)_4$, and it most often occurs as clay-sized, platelike, hexagonally shaped crystals. Preferably, the non-pigmented filler is present in an amount sufficient to render the rheology of the composition suitable to function as a pumpable adhesive. Preferably, the non pigmented filler is present in part 1 in an amount of about 8 parts by weight or greater and most preferably about 15 parts by weight or greater. Preferably, the non pigmented filler is present in part 1 in an amount of about 22 parts by weight or less and most preferably about 18 parts by weight or less.

The parts of the composition of this invention may further comprise a reinforcing filler which is present to improve the strength and rheology of the composition. The preferred class of reinforcing fillers is carbon black. The reinforcing filler is present in a sufficient amount to reinforce the composition and to improve the rheology of the composition. In automotive applications, nonconductivity is generally understood to mean an impedance of the composition of at least $10^{10}$ Ohm-cm. Preferably, the reinforcing filler is present in an amount such that the parts of the composition are nonconductive. If too much of certain reinforcing fillers, such as carbon black, are present the composition may be conductive. When carbon black is used as the reinforcing filler, the carbon black used may be a standard carbon black. Standard carbon black is carbon black which is not specifically surface treated or oxidized to render it nonconductive. One or more nonconductive carbon blacks may be used in conjunction with the standard carbon black, although such inclusion may add unnecessary costs. The amount of standard carbon black in the composition is that amount which provides the desired color, viscosity, sag resistance and strength. If nonconductivity of the composition is desired, standard carbon black may be utilized at a level at which the composition is nonconductive. The reinforcing filler is preferably present in the either or both of the components, based on the weight of the component, in an amount based on each component of at least about 5 percent by weight, more preferably by at least about 10 percent by weight and most preferably at least about 12 percent by weight. The reinforcing filler is preferably present in either one or both of the components, based on the weight of the component, in an amount of no more than about 30 percent by weight, more preferably no more than about 25 percent by weight, and most preferably no more than about 18 percent by weight. If conductive carbon black is used, attention must be paid to keep the concentration below about 18 percent by weight in the overall composition to prevent the impedance of the composition to be above $10^{10}$ Ohm-cm, compositions below this amount are considered to be nonconductive. Standard carbon blacks are well known in the art and include RAVEN™ 790, RAVEN™ 450, RAVEN™ 500, RAVEN™ 430, RAVEN™ 420 and RAVEN™ 410 carbon blacks available from Colombian and CSX™ carbon blacks available from Cabot, and PRINTEX™30 carbon black available from Degussa. Nonconductive carbon blacks are well known in the art and include RAVEN™ 1040 and RAVEN™ 1060 carbon black available from Colombian.

Another class of filler useful in one or both parts of the composition are clays which are added for the purpose of improving the cost effectiveness, viscosity and nonconductive nature of the compositions of the invention. Preferred clays useful in the invention include kaolin, surface treated kaolin, calcined kaolin, aluminum silicates and surface treated anhydrous aluminum silicates. The clays can be used in any form which facilitates formulation of a pumpable adhesive. Preferably, the clay is admixed in the form of pulverized powder, spray-dried beads or finely ground particles. Clays may be used in an amount of about 0 percent by weight or greater of the composition of the invention, more preferably about 10 percent by weight or greater and even more preferably about 18 percent by weight or greater. Preferably, the clays are used in an amount of about 22 percent by weight or less of the composition of the invention and more preferably about 40 percent by weight or less.

The adhesive composition may further comprise a filler which functions as a thixotrope (rheological additive). Such thixotropes are well known to those skilled in the art and include fumed silica and the like. The thixotrope may be added to the composition, in either or both parts, in a sufficient amount to give the desired rheological properties. Preferably, the thixotrope is present in an amount of about 0 percent by weight or greater based on the weight of the composition of the invention, preferably about 1 part by weight or greater. Preferably, the optional thixotrope is present in an amount of about 10 percent by weight or less based on the weight of the composition of the invention and more preferably about 2 percent by weight or less.

One or both parts of the composition of the invention may further comprise a catalyst known to the skilled artisan for the reaction of isocyanate moieties with water or active hydrogen containing compounds. Preferably, the catalysts are not volatile at ambient conditions. Such compounds are well known in the art. Preferably, the catalyst is located in the second part, part B, of the composition. Preferred catalysts include organometallic compounds, amine based catalysts or mixtures thereof. Preferably, a mixture of a organometallic compounds and an amine based catalyst is utilized. Among preferred organometallic catalysts are metal alkanoates, metal acetates, metal acetylacetonates, and tertiary amines. Preferred metal alkanoate catalysts include bismuth, zinc, potassium and sodium alkanoates, such as bismuth octoate, bismuth neodecanoate, zinc octoate, potassium octoate, and sodium octoate. Metal acetates include potassium acetate. Metal acetyl acetonates include iron acetyl acetonate and dibutyl tin diacetylacetonate. Preferred metal salt catalysts contain bismuth or tin as the metal, with tin most preferred. Preferred amine catalysts include dimorpholinodialkyl ether, di((dialkylmorpholino)alkyl)ethers, bis-(2-dimethylamino-ethyl)ether, triethylene diamine, pentamethyldiethylene triamine, N,N-dimethylcyclo-hexylamine, N,N-dimethyl piperazine 4-methoxyethyl morpholine, N-methylmorpholine, N-ethyl morpholine, and mixtures thereof. A preferred dimorpholinodialkyl ether is dimorpholinodiethyl ether. A preferred di((dialkyl-morpholino)alkyl)ether is (di-(2-(3,5-dimethyl-morpholino)ethyl)ether). Tertiary amines are employed in an amount sufficient to catalyze the reaction of isocyanate groups with active hydrogen containing compounds, preferably the tertiary amines are utilized in amounts based on the weight of the composition, of about 0.15 parts by weight or greater and most preferably about 0.2 parts by weight or greater and about 2.0 parts by weight or less, more preferably about 1.75 parts by weight or less, even more preferably about 1.0 part by weight or less and most preferably about 0.4 parts by weight or less. Organometallic compound based catalysts, when employed are preferably employed in an amount, based on the weight of the adhesive composition, of about 0 parts by weight or greater, more preferably about 0.1 parts by weight or greater, even more preferably about 0.2 parts by weight or greater and most preferably about 0.4 parts by weight or greater. Such organometallic compound based catalysts are preferably employed in an amount, based on the weight of the adhesive composition of about 5 parts by weight or less, more preferably about 2.0 parts by weight or less, even more preferably about 1 part by weight or less and most preferably about 0.6 parts by weight or less.

Either or both of Part A, the resin part and part B, the curative part, may contain pigments, stabilizers ultraviolet stabilizers, ultraviolet stabilizers, antioxidants and other additives commonly present in curable polyurethane forming compositions and adhesives. To prevent premature hydrolysis of the moisture sensitive groups of the isocyanate reactive component, fillers and pigments should be thoroughly dried before admixture therewith.

The curable composition of this invention may further comprise plasticizers so as to modify the rheological properties to a desired consistency. Such materials should be free of water, inert to isocyanate groups and compatible with the polymers present. Plasticizers can be located in either part. Suitable plasticizers are well known in the art and preferable plasticizers include alkyl phthalates, such as diisononylphthalate or diisodecylphthalate, partially hydrogenated terpenes, trioctyl phosphate, toluene-sulfamide, esters of alkylsulfonic acid, adipic acid esters, castor oil, toluene and alkylnaphthalenes. The amount of plasticizer in each part of the curable composition is that amount which gives the desired rheological properties. The amounts disclosed herein include those amounts added during preparation of the isocyanate containing prepolymer and during compounding of the curable composition. Preferably, plasticizers are used in the composition of the invention in an amount of about 0 percent by weight or greater based on the weight of the composition of the invention, more preferably about 5 percent by weight or greater and most preferably about 10 percent by weight or greater. The plasticizer is preferably used in an amount of about 45 percent by weight or less based on the weight of the composition of the invention and more preferably about 40 percent by weight or less.

The composition of this invention may further comprise stabilizers, which function to protect the adhesive composition from moisture, thereby inhibiting advancement and preventing premature crosslinking of the isocyanates in the curable formulation. Stabilizers known to the skilled artisan for polyurethane curable two-part compositions may be used herein. Included among such stabilizers are diethylmalonate, alkylphenol alkylates, paratoluene sulfonic isocyanates, benzoyl chloride and orthoalkyl formates or molecular sieves. Such stabilizers are preferably used in an amount of about 0.1 percent by weight or greater based on the total weight of the composition of the invention, preferably about 0.5 percent by weight or greater and more preferably about 0.8 percent by weight or greater. Such stabilizers are used in an amount of about 5.0 percent by weight or less based on the weight of the composition of the invention, more preferably about 2.0 percent by weight or less and most preferably about 1.4 percent by weight or less.

The composition of this invention may further comprise an adhesion promoter, such as those disclosed in Mahdi, U.S. Patent Publication 2002/0100550, paragraphs 0055 to 0065 and Hsieh, U.S. Pat. No. 6,015,475 column 5, line 27 to column 6, line 41, incorporated herein by reference. The amounts of such adhesion promoters useful are also disclosed in these references and incorporated herein by reference.

The two-parts of the composition of the invention are preferably combined such that the equivalents of isocyanate groups are greater than the equivalents of the isocyanate reactive groups. Preferably, the amount of the isocyanate groups provided by the isocyanate functional prepolymer and the polyfunctional isocyanates are chosen to give the desired ratio of isocyanate groups in part A to isocyanate reactive groups in Part B. Preferably, the ratio of isocyanate groups in component A to isocyanate reactive groups (such as active hydrogen groups) is at least about 1.1, more preferably about 1.15 or greater, most preferably about 1.2 or greater and not more than about 1.8, more preferably about 1.5 or less, most preferably about 1.3 or less. The functionality of the two components is adjusted in such a way such that the resulting crosslinked density of the cured adhesive provides the desired modulus.

The parts or the curable composition of this invention may be formulated by blending the components together using means well known in the art. Generally, the components are blended in a suitable mixer. Such blending is preferably conducted in under vacuum or in an inert atmosphere, such as nitrogen or argon, in the absence of oxygen and atmospheric moisture to prevent premature reaction. It may be advantageous to add plasticizers to the reaction mixture for preparing the isocyanate containing component so that such mixtures may be easily mixed and handled. Alternatively, the plasticizers can be added during blending of all the components. Preferably, the components are blended at a temperature of about 20° C. to about 100° C., more preferably about 25° C. to about 70° C. The ingredients are blended for a sufficient time to prepare a well blended mixture, preferably from about 10 to about 60 minutes. Once the parts or the curable composition are formulated, they are packaged in a suitable container such that they are protected from atmospheric moisture and oxygen. Contact with atmospheric moisture and oxygen could result in premature crosslinking of the isocyanate functional prepolymer.

The polymerizable compositions of the invention are used as two-part adhesives. The components of the polymerizable compositions are blended as would normally be done when working with such materials. For a two-part polymerizable composition, useful as an adhesive, such as those of the invention to be most easily used in commercial and industrial environments, the volume ratio at which the two-parts are combined is preferably a convenient whole number. This facilitates application of the curable composition with conventional, commercially available dispensers including static and dynamic mixing. Such dispensers with static mixing are shown in U.S. Pat. Nos. 4,538,920 and 5,082,147 (incorporated herein by reference) and are available from Conprotec, Inc. (Salem, N.J.) under the trade name MIXPAC or Sulzer Quadro of Sulzer Ltd., Switzerland. Typically, these dispensers use a pair of tubular receptacles arranged side-by-side with each tube being intended to receive one of the two-parts of the polymerizable composition. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two-parts. The blended polymerizable composition is extruded from the mixing chamber onto a substrate. When using electrically-driven equipment, dynamic mixing may be used. Once the tubes have been emptied, they can be replaced with fresh tubes and the application process continued. The volumetric ratio at which the two-parts of the polymerizable composition are combined is controlled by the diameter of the tubes. (Each plunger is sized to be received within a tube of fixed diameter, and the plungers are advanced into the tubes at the same speed.) A single dispenser is often intended for use with a variety of different two-part polymerizable compositions and the plungers are sized to deliver the two-parts of the polymerizable composition at a convenient mix ratio. Some common mix ratios are 1:1, 2:1, 4:1 and 10:1. Preferably, the two-parts are blended at a mix ratio of about 1:1.

Preferably, the mixed two-part compositions of the invention have a suitable viscosity to allow application without dripping. Preferably, the viscosities of the two individual components should be of the same order of magnitude. Preferably, for compositions mixed utilizing static mixing the individual components prior to mixing have the viscosity of about 10 Pa·S (10,000 centipoises) or greater, more preferably about 20 Pa·S (20,000 centipoises) or greater and most preferably about 40 Pa·S (40,000 centipoises) or greater. Preferably, the mixed two-part compositions have a viscosity prior to cure of about 150 Pa·S (150,000 centipoises) or less, more preferably about 120 Pa·S (120,000 centipoises) or less and most preferably about 100 Pa·S (100,000 centipoises) or less. "Viscosities" as used in this passage are determined as a shear rate of 20 reciprocal second measured with a cone plate rheometer of 20 mm diameter and 4° angle. Higher viscosities require dynamic mixing. For lower viscosities the components may require gelling agent known in the art to prevent sag of the uncured adhesive system.

The polymerizable compositions of the invention are used to bond a variety of substrates together as described hereinbefore. The compositions can be used to bond porous and nonporous substrates together. The polymerizable composition after contacting the two-parts together is applied to a first substrate and the polymerizable composition on the first substrate is thereafter contacted with a second substrate. In preferred embodiments, the surfaces to which the composition of the invention is applied are cleaned and optionally activated and/or primed prior to application. Generally, the composition of the invention is applied at a temperature at which the polymerizable composition can be pumped. Preferably, the polymerizable composition of the invention is applied at a temperature of about 0° C. or greater for application, more preferably a temperature of about 18° C. or greater. Preferably, the polymerizable composition of the invention is applied at a temperature of about 45° C. or less for application, more preferably a temperature of about 35° C. or less. The polymerizable composition starts to cure upon contacting the two-parts. Curing can be accelerated by applying heat to the curing adhesive by means of convection heat, microwave heating and the like.

The contacted composition is preferably used to bond glass to other substrates such as metal or plastics. In a preferred embodiment, the first substrate is a glass window and the second substrate is a window frame. In another preferred embodiment, the first substrate is a glass window and the second substrate is a window frame of a vehicle, preferably vehicles used for mass transportation. Preferably, the glass window is cleaned and may have a glass wipe or primer applied to the area to which the adhesive is to be bonded. The window flange may be primed with a paint primer. The contacted composition is applied in a bead to the periphery of the window located such that it will contact the window flange when placed in the vehicle. The window with the contacted composition located thereon is then placed into the flange with the contacted composition located between the window and the flange. The contacted composition bead is a continuous bead that functions to seal the junction between the window and the window flange. A continuous bead of adhesive is a bead that is located such that the bead connects at each end to form a continuous seal between the window and the flange when contacted. Thereafter, the contacted composition is allowed to cure. The composition of the invention after contacting with the substrate has sufficient green strength to prevent movement of the window at less than 90 minutes, more preferably at less than 60 minutes after it is assembled. The composition of the invention is especially useful for bonding large mass substrates of more than 20 Kg, up to about 120 Kg, to the substrates. One class of large mass substrates the composition of the invention are large windows such as those utilized in mass transportation vehicles.

In a preferred embodiment, the composition of the invention is used to replace windows in structures or vehicles and most preferably in vehicles. The first step is removal of the previous window. This can be achieved by cutting the bead of the adhesive holding the old window in place and then removing the old window. Thereafter the new window is cleaned and primed. The old adhesive that is located on the window flange can be removed, although it is not necessary and in most cases it is left in place. The window flange is preferably primed with a paint primer. The adhesive is applied in a bead to the periphery of the window located such that it will contact the window flange when placed in the vehicle. The window with the adhesive located thereon is then placed into the flange with the adhesive located between the window and the flange. The adhesive bead is a continuous bead that functions to seal the junction between the window and the window flange and to strengthen the body structure by up to about 40 percent. A continuous bead of adhesive is a bead that is located such that the bead connects at each end to form a continuous seal between the window and the flange when contacted. Thereafter the adhesive is allowed to cure. The adhesive demonstrates rapid strength development which facilitates rapid drive away times of preferably one hour, and more preferably 30 minutes, after application of the adhesive at temperatures of from about 0° F. (−18° C.) to about 115° F. (46° C.). In particular, windshields installed under such conditions meet United States Federal Motor Vehicle Safety Standard (FMVSS) 212.

In one embodiment, the composition of the invention is preferably used to bond metal, coated metal (with e-coat or a paint system), plastic, fiber reinforced plastic, wood and/or glass together. In another embodiment, the compositions of the invention can be used to bond modular components to a car body or to each other. Examples of modular components include vehicle modules, such as a door, window, roof module or body. The polymerizable compositions of the invention can be also used to bond exterior or interior trim to automobile bodies.

In certain applications, the polymerizable composition of the invention may be utilized with a primer or an activation wipe. The primer or activation wipe is typically applied to the surface of one or more of the substrates. Any solvent is allowed to volatilize away and then the polymerizable composition is contacted with the substrates. Preferably, the time period from application of the primer or activation wipe to application of the polymerizable composition to the substrate is about 0.5 minutes or greater, more preferably about 1 minutes or greater and most preferably about 2 minutes or greater.

The polymerizable composition is capable of bonding to certain substrates in the absence of a primer or of any other treatment of the surface of the substrate, except cleaning of the surface. Substrates which the polymerizable composition bonds to without the need for primer or surface treatment typically include sheet molding compound (SMC), fiber reinforced plastics, such as polyester, and coated metals, e.g., e-coated aluminium and steel and painted metal sheets.

The polymerizable compositions of the invention preferably exhibit adequate green strength to hold substrates together without moving with respect to one another without the application of force to one of the substrates after about 90 minutes, more preferably after about 60 minutes and most preferably after about 30 minutes. The polymerizable compositions of the invention preferably exhibit full cure after about 1 day at room temperature. Faster cure may be achieved by heating at temperatures of up to about 120° C. Below 23° C. curing time will be longer. The polymerizable composition of the invention preferably exhibits a tensile strength after complete cure of about 4 MPa or greater, more preferably about 5 MPa or greater and most preferably about 6 MPa or greater. The polymerizable composition of the invention preferably exhibits a lap shear strength after 2 hours of about 1 MPa or greater, more preferably about 2 MPa or greater and most preferably about 3 MPa or greater, wherein the lap shear strength is determined according to DIN 53283. The polymerizable composition of the invention preferably exhibits an elongation at break after complete cure of about 100 percent or greater, more preferably about 200 percent or greater and most preferably about 300 percent or greater. The polymerizable composition of the invention preferably exhibits an elongation at break after complete cure of about 350 percent or less. Elongation at break is determined according to DIN 53504.

"Molecular weights" as described herein are number average molecular weights which may be determined by Gel Permeation Chromatography (also referred to as SEC). For polyurethane prepolymers, it is also possible to calculate approximate number average molecular weight from the equivalent ratio of the isocyanate compounds and of the polyol compounds with which they are reacted as known to the persons skilled in the art. Unless otherwise stated all parts and percentages are by weight and based upon the weight of the composition of the invention.

Illustrative Embodiments of the Invention

The following examples are provided to illustrate the invention, but are not intended to limit the scope thereof. All parts and percentages are by weight unless otherwise indicated. The ingredients used in the prepolymers prepared in the following examples are described in Table 1.

TABLE 1

| Ingredients | | | |
|---|---|---|---|
| Raw Material | Name | Vendor | Spec |
| Polyoxyalkylate diol | VORANOL ™ EP 2000L | Dow | MG: 2000 g/mol; OH#: 55.0; functionality: 2 |
| Polyoxyalkylate triol | VORANOL ™ CP 4655 | Dow | MG: 4650 g/mol; functionality: 2.6 |
| SAN-grafted polyoxyalkylate triol | SPECFLEX ™ NC 700 | Dow | MG: 6000 g/mol; OH#: 21.2; functionality: 2.7 |
| Diphenylmethane 4,4'-diisocyanate | ISONATE ™ M 125 | Dow | |
| Polyoxyalkylate diol | PPG ™ 2025 | Dow | MG: 2000 g/mol |
| Polyurea dispersed polyoxyalkylate triol | POLY G ™ 85-36 | Olin Chemicals | MG: 4500 g/mol |
| Diphenylmethane 4,4'-diisocyanate | ISONATE ™ M 125 | Dow | |
| Polyalkylate diol | PPG ™ 2025 | Dow | MG: 2000 g/mol |
| SAN-grafted polyoxyalkylate triol | SPECFLEX ™ NC 700 | Dow | MG: 6000 g/mol; OH#: 21.2; functionality: 2.7 |
| Catalyst (stannous octoate) | DABCO ™ DC 21 | Air Products | Dabco-Tin-complex |
| Bisoxazolidine | HARDENER ™ OZ | Bayer | |
| Dialkyl phthalate plasticizer | | | |

A polyether polyurethane prepolymer is prepared by mixing 22.571 g of a polyoxypropylene diol having an average molecular weight of 2000 g/mol with 33.132 g of a polyoxypropylene triol having an average molecular weight of 4650 g/mol. 33.779 g of plasticizer agent are added. In addition, 9.501 g diphenylmethane 4,4'-diisocyanate are added. Afterwards, 0.001 g of orthophosphoric acid in 0.009 g methyl ethyl ketone (MEK) and 1 g of diethylmalonate are added. Then, the entire mixture is heated to 50° C. in a reactor and 0.007 g of stannous octoate are added. The reaction is carried out for 1 hour at 50° C. The resultant prepolymer is referred to herein as NCO-prepolymer-1.

A polyether polyurethane prepolymer containing SAN-copolymer solids is prepared by placing 60.58 g of a SAN-co-polyoxypropylene triol, with 40 percent SAN-solid content, 31.98 g of plasticizer, 0.001 g orthophosphoric acid in 0.009 g methyl-ethyl-ketone in a reactor. SAN is styrene acrylonitrile. After homogenization by mixing 7.41 g of diphenylmethane 4,4'-diisocyanate are added. Again, the mixture is homogenized. Then, the reactor is heated to 50° C. Afterwards 0.02 g stannous octoate is added and the reaction is carried out for 1 hour at 50° C. The resultant prepolymer is referred to as NCO-prepolymer-2.

A polyether polyurethane prepolymer is prepared by mixing 38.699 g of a polyoxypropylene diol having an average molecular weight of 2000 g/mol with 18.516 g of a polyoxypropylene triol having an average molecular weight of 4650 g/mol. 31.854 g of plasticizer agent are added. In addition, 10.701 g diphenylmethane 4,4'-diisocyanate is added. Afterwards, 0.001 g of orthophsphoric acid in 0.009 g MEK and 0.213 g of diethylmalonate are added. Then, the entire mixture is heated to 50° C. in a reactor and 0.007 g of stannous octoate is added. The reaction is carried out for 1 hour at 50° C. The resultant prepolymer is referred to herein as NCO-prepolymer-3.

This example prepares an isocyanate functional prepolymer of example 1 of U.S. Pat. No. 5,852,103A polyether polyurethane prepolymer with low degree of branching is prepared by mixing 363.68 g of polyoxylate diol having a molecular weight of 2000 with 527.04 g of polyurea dispersed in a polyoxyalkylate triol having a molecular weight of 4500. Mixing is carried out in a reactor by heating the mixture to 55° C. 160.6 g of diphenylmethane-4,4'-diisocyanate and 0.17 g of stannous octoate is added to the mixture. The whole mixture is then reacted for one hour. Finally, 525.44 g of plasticizing agent diallyl phthalate is added to the mixture and the mixing continued for one hour. The resultant prepolymer is refereed to herein as NCO-prepolymer-4.

TABLE 2

| Composition of the Isocyanate Functional Prepolymers | | | | |
|---|---|---|---|---|
| Ingredients | NCO-Pre-polymer-1 (%) | NCO-Pre-polymer-2 (%) | NCO-Pre-polymer-3 (%) | NCO-Pre-polymer-4 (%) |
| Polyoxyalkylate diol | 22.571 | — | 38.699 | 23.0625 |
| Polyoxyalkylate triol | 33.132 | — | 18.516 | |
| Polyurea dispersed in Polyalkylate triol | | | | 33.4219 |
| SAN-grafted polyoxyalkylate triol | — | 60.58 | — | |
| Orthophosporic acid | 0.001 | 0.001 | 0.001 | |
| Methyl-ethyl-ketone | 0.009 | 0.009 | 0.009 | |
| Diphenylmethane 4,4'-diisocyanate | 9.501 | 7.41 | 10.701 | 10.1463 |
| Plasticizer | 33.779 | 31.98 | 31.854 | 33.3204 |
| Stannous Octoate | 0.007 | 0.02 | 0.007 | .0001 |
| Diethylmalonate | 1 | — | 0.213 | |

Preparation of OH-Endcapped Prepolymer 61.4 g of the NCO-prepolymer-3 is placed in a reactor. 2.53 g of 2-Mercaptoethanol for endcapping is added to the reactor vessel. After that, 0.01 g in 0.139 g Toluene is added and the mixture is heated to 50° C. while steering. The reaction was carried out for 1 hour at 50° C. The resultant prepolymer is referred to herein as OH-prepolymer-1. In addition, the resultant prepolymer was viscous material with zero free isocyanate functionalities.

This example is the preparation of OH-Prepolymer composition of example 1 of U.S. Pat. No. 5,852,103. A hydroxyl functional polyurea dispersed polyether polyurethane prepolymer is synthesized by reacting the polyoxyalkylate diol and a polyurea dispersed polyoxyalkylate triol. This mixture is stirred and heated to 55° C. and diphenylmethane-4,4'-diisocyanate and stannous octoate are added and mixed for another 30 minutes. Plasticizing agent, plasticizer (DAP), is added and the mixture is stirred for another 30 minutes. The resultant prepolymer is viscous material with zero free isocyanate functionalities. The components used to prepare each hydroxyl functional prepolymer are compiled in the table below.

Preparation of Part A of Adhesive Composition:

Four compositions useful as Part A are prepared using the isocyanate functional prepolymers 1 to 4. The prepolymer (component 1) is placed in a planetary mixer and degassed for 30 minutes. In the case of compositions A-2 and A-3 component 2 is added before degassing. Then, components 3 to 6 are added in the appropriate amounts. After that, the mixture is mixed for 30 minutes under vacuum. At the end components 7 to 10 are added and again mixed for 15 minutes.

TABLE 3

Adhesive compositions A-component:

| | | A-1 | A-2* | A-3 | A-4* |
|---|---|---|---|---|---|
| 1 | NCO-prepolymer-1% | 60.8 | 50.5 | 42 | |
| | NCO-prepolymer-2 | | | 17.5 | |
| | NCO-prepolymer-4 | | | | 66.3 |
| 2 | Diphenylmethane 4,4'-diisocyanate | | 2.5 | 1.5 | |
| 3 | AEROSIL ™ HDK H20 | 0.15 | | | |
| 4 | Carbon Black | 23.75 | 15 | 15 | 26.1 |
| 5 | Clay | 13.5 | 18 | 20 | 7.4 |
| 6 | Calcium Carbonate | | | 12 | |
| 7 | Plasticizer | | 2 | 4 | |
| 8 | Diethylmalonate | 0.5 | | | |
| 9 | Bismuth Octoate | 1.3 | | | |
| 10 | Dimorpholinodiethylether | | | | 0.2 |

*comparative.

Preparation of Part B of Adhesive Composition:

Part B curative compositions are prepared using the hydroxyl functional prepolymers by placing components 1, 5, 6, 7 and 8 in a planetary mixer. The liquid components are mixed under vacuum for 30 minutes. Then, components 2, 3 and 4 are added and again mixed for 30 minutes under vacuum. After that, components 9 or 10 are added and mixed for 15 minutes. Each of the compounds is shown in table.

TABLE 4

Adhesive compositions B-component:

| | | B-1 | B-2* | B-3 | B-4* |
|---|---|---|---|---|---|
| 1 | OH-Prepolymer-1% | | 61.4 | | |
| | OH-Prepolymer-2 | | | | 69.1 |
| | SAN-grafted polyoxyalkylate triol | 60.1 | | 41.8 | |
| | Polyoxyalkylate diol | | | | 9 |
| | 1,4 Butanediol | 0.4 | | | |
| 2 | Carbon Black | 5 | 14.8 | 10 | 15.3 |
| 3 | Clay | 28.6 | 21.6 | 28.5 | 15.3 |
| 4 | Plasticizer | 4.7 | | 6 | |
| 5 | Toluene | | 1.7 | | |
| 6 | Diethylmalonate | | 0.4 | | |
| 7 | Bisoxazolidine | | | | 0.1 |

TABLE 4-continued

Adhesive compositions B-component:

| | | B-1 | B-2* | B-3 | B-4* |
|---|---|---|---|---|---|
| 8 | Bismuth Octoate | | | | 0.2 |
| 9 | Tin Catalyst (Dabco DC21) | | 0.3 | | 0.5 |

Characterization Methods:

Parts A and B are sampled into 300 ml cartridges and assembled to a kit with a dynamic mixing head to fit a high speed mixing electric gun (BETAGUN™). The materials are extruded at high speeds at a 1:1 mixing volume based ratio. The lap shear strength is measured as described in norm ASTM D-3168 after a specific curing period of 2 hours. The decking performance is measured as follows: A triangular bead, 1 cm of height, 7 mm of width, and 10 cm of length, is placed on an unprimed glass strip and placed on a "penetrometer PNR 6" of SUR Berlin. After that a 5 g weight of the penetrometer is positioned gap-free over the bead. Then, the weight is released for 5 seconds and allowed to travel into the material. The distance of travel is reported and is referred to as decking. The decking is validated after the bead has been left laying open for 15 minutes and for 30 minutes. The working time is measured as follows: A triangular bead, 1 cm of height, 7 mm of width at the base is extruded onto a stable surface at 23° C. and 50 percent relative humidity). After extrusion the time is monitored and a wooden spatula is compressed into the bead and pulled away. The working time is determined by the point in time when the adhesive does not attach to the spatula.

TABLE 5

Working Times and Lapshear Strength

| | Adhesive | | | |
|---|---|---|---|---|
| | A1-B1 | A2-B2* | A3-B3 | A4-B4* |
| Properties | | | | |
| Working Time (Min) | 30 | 20 | 30 | 12 |
| Lap shear after 2 hours (MPa) | 3.7 | 1.4 | 2 | 2.6 |

*Comparative

Table 5 describes the various working times of the different adhesives. The compositions of the invention demonstrate in the samples "Adhesive A1-B1" and "Adhesive A3-B3" a long working time combined with a high lap shear. Comparative samples "Adhesive A2-B2" and "Adhesive A4-B4" made of known technology either have a long working time and low lap shear value like "Adhesive A2-B2" or a high lap shear, but a short working time in the case of "Adhesive A4-B4".

TABLE 6

Decking

| | A1-B1 mm | A2-B2* mm | A3-B3 mm |
|---|---|---|---|
| Decking after 15 min Working time | | | |
| 5° C. | 2.2 | 4.0 | 2.4 |
| 23° C. | 2.2 | 3.2 | 2.1 |
| 40° C. | 1.8 | 1.7 | 1.5 |
| Decking after 30 min Working time | | | |
| 5° C. | 1.1 | 3.2 | 3.7 |

TABLE 6-continued

Decking

|  | A1-B1 mm | A2-B2* mm | A3-B3 mm |
|---|---|---|---|
| 23° C. | 1.5 | 3.1 | 1.9 |
| 40° C. | 0.9 | 0.2 | 1.0 |

Table 6 shows the decking performance of several adhesive types. "Adhesive A1-B1" and "Adhesive A3-B3", represent compositions of the invention whereas "Adhesive A2-B2" represents standard technology, which is utilized for applications where a long working time combined with high handling strength is required. The decking performance is validated after 15 and 30 minutes at various temperatures, which can occur during typical assembly installation indoors and outdoors. The decking performance of samples "Adhesive A1-B1" and "Adhesive A3-B3" after the bead had been left laying open (15 min working time) show a slight decrease in decking over temperature range of 5 to 40° C. The "Adhesive A2-B2", which is of standard technology, provides a large change of 4 to 1.7 mm within the temperature range. The decking after a working time of 30 minutes shows the least change on sample "Adhesive A1-B1" varying from 1.1 to 0.6 mm over the temperature range. "Adhesive A3-B3" provides a higher intrusion of 3.7 mm at 5° C., but still is softer at 40° C. with 1 mm of decking. The regular sample "Adhesive A2-B2" provides a high intrusion of 3.2 at 5° C. and stiffens at 40° C. providing an intrusion of 0.2 mm. The decking performance of an adhesive is appropriate when the intrusion is above 0.9 mm. To sum up, the inventive adhesive provides an affect that provides sufficient resistance to glass slippage due to good lap shear performance and resistance of the glass to sink onto the flange. Part A and part B were inserted into a high-speed electric mixing applicator gun with the appropriate dynamic mixing head. The material in both tubes was extruded at high speeds at a 1:1 ratio on a volume basis using this gun. The decking of the new material is more stable over a large temperature range than with standard products. Decking is measured via a penetrometer, which measures material penetration of a defined weight within a time frame of 5 seconds.

What is claimed is:

1. A two-part composition comprising:
    A) in one part (i) one or more isocyanate functional prepolymers; and
    B) in a second part (ii) one or more compounds having isocyanate reactive groups;
    (iii) one or more fillers selected such that the composition is nonconductive; and
    (iv) one or more catalysts for the reaction of isocyanate groups with isocyanate reactive compounds:
    wherein either or both of the one or more isocyanate functional prepolymers and the one or more compounds having isocyanate reactive groups have solid organic particles grafted thereto such that the composition contains from about 6 to about 13 percent by weight of the total composition of the solid organic particles; wherein the composition after contacting the two parts exhibits a lap shear strength after 2 hours of 2.0 MPa or greater and an open time of about 15 minutes to about 30 minutes.

2. A two-part composition comprising:
    A) in one part (i) one or more isocyanate functional prepolymers; and
    B) in a second part(ii) one or more compounds having isocyanate reactive groups:
    (iii) one or more fillers selected such that the composition is nonconductive; and
    (iv) one or more catalysts for the reaction of isocyanata groups with isocyanate reactive compounds;
    wherein either or both of the one or more isocyanate functional prepolymers and the one or more compounds having isocyanate reactive groups have solid organic particles grafted thereto such that the composition contains from about 6 to about 13 percent by weight of the total composition of the solid organic particles; wherein the composition after contacting the two parts exhibits a lap shear strength after 2 hours of 2.0 MPa or greater and an open time of about 15 minutes to about 30 minutes:
    wherein the second part comprises from about 35 to about 65 percent by weight of a compounds having isocyanate reactive groups and solid organic particles grafted to the backbone of the compound.

3. A two-part composition according to claim 1 wherein one or more isocyanate functional prepolymers comprise about 2 to about 26 percent by weight of solid organic particles grafted to the backbone of the prepolymers.

4. A two-part composition according to claim 1 wherein the solid particles comprise a thermoplastic polymer or rubber-modified thermoplastic polymer.

5. A two-part composition according to claim 1 I wherein the solid particles comprise a rubber-modified thermoplastic polymer.

6. A two-part composition according to claim 1 wherein the solid particles comprise copolymers of monovinylidene aromatic monomers with conjugated dienes, acrylates, methacrylates, unsaturated nitriles or mixtures thereof.

7. A two-part composition according to claim 2 wherein the second part further comprises from about 5 to about 30 percent by weight of one or more compounds having isocyanate reactive groups, which are free of solids.

8. A two-part composition according to claim 1 wherein the one or more fillers comprise nonconductive carbon black or an amount of conductive carbon b lack such that the composition is not conductive.

9. A two-part composition according to claim 1 wherein the one or more conductive carbon blacks is present in an amount of about 18 percent by weight or less.

10. A two-part composition according to claim 1 wherein the one or more fillers comprise a nonpigmented filler in an amount sufficient to render the rheology of the composition suitable to function as a pumpable adhesive.

11. A two-part composition according to claim 1 wherein the catalyst comprises one or more organometallic compounds or amines.

12. A two-part composition according to claim 11 where in the catalyst comprises one or more organometallic compounds and one or more amines.

13. A two-part composition according to claim 1 wherein part B further comprises a polyester based polyol.

14. A two-part composition according to claim 1 wherein part A contains an isocyanate function prepolymer having the residue of a polyester polyol in the backbone.

15. A two-part composition according to claim 1 wherein part B further comprises a chain extender or a crosslinker.

16. A two-part composition according to claim 1 wherein part A further comprises a polyfunctional polyisocyanate.

17. A two-part composition according to claim 1 wherein the ratio of isocyanate groups in Part A to the isocyanate reactive groups in part B is greater than 1.1 :1.0.

18. A method of bonding two or more substrates together comprising contacting the two-parts of a composition according to claim 1 and contacting the contacted parts of the composition with two or more substrates with the contacted parts of the composition disposed between substrates so as to bond the substrates together.

19. A method according to claim 18 wherein one substrate is glass and the other substrate comprises a building or an apparatus used in transporting goods and/or people.

20. A method according to claim 19 wherein the glass substrate is a window and has a mass of greater than about 20 to about 120 kilograms and two hours after contact exhibits an lap shear strength of about 2.0 MPa or greater.

* * * * *

UNITED STATES PATENT AND TRADEMARK OFFICE
CERTIFICATE OF CORRECTION

| | | |
|---|---|---|
| PATENT NO. | : 8,668,804 B2 | Page 1 of 1 |
| APPLICATION NO. | : 13/002666 | |
| DATED | : March 11, 2014 | |
| INVENTOR(S) | : Golombowski | |

It is certified that error appears in the above-identified patent and that said Letters Patent is hereby corrected as shown below:

In the Claims

Column 22, Line 3, Delete "reaction of isocyanata groups" and insert --reaction of isocyanate groups--

Column 22, Line 25, Delete "claim 1 I wherein" and insert --claim 1 wherein--

Column 22, Line 38, Delete "carbon b lack such that" and insert --carbon black such that--

Signed and Sealed this
Sixteenth Day of September, 2014

Michelle K. Lee
*Deputy Director of the United States Patent and Trademark Office*